(No Model.)
A. ANDERSON.
SLED PROPELLER.
No. 599,678.  Patented Mar. 1, 1898.
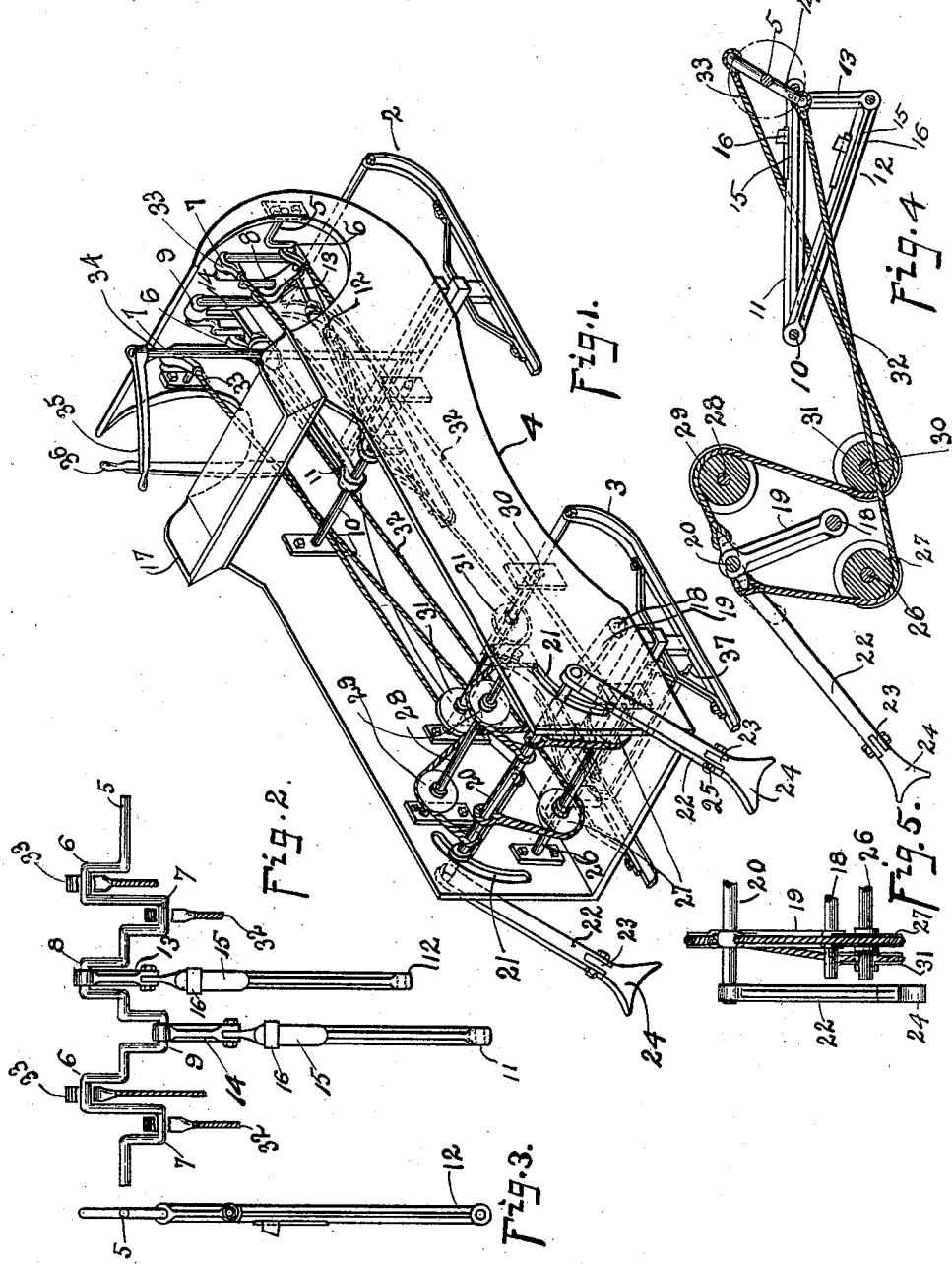
Witnesses:
W. Rice Cowles,
Richard Paul.
Inventor
Anders Anderson
By Paul W. Hawley
his attorneys
THE NORRIS PETERS CO., PHOTO-LITHO., WASHINGTON, D. C.

UNITED STATES PATENT OFFICE.

ANDERS ANDERSON, OF NELSON, MINNESOTA.

SLED-PROPELLER.

SPECIFICATION forming part of Letters Patent No. 599,678, dated March 1, 1898.

Application filed June 24, 1897. Serial No. 642,023. (No model.)

*To all whom it may concern:*

Be it known that I, ANDERS ANDERSON, a citizen of the United States, residing at Nelson, Douglas county, Minnesota, have invented certain new and useful Improvements in Sleds, of which the following is a specification.

My invention relates to devices for propelling sleds over the snow and ice; and the object of the invention is to provide a mechanism arranged to be operated by foot-power for propelling the sled.

My invention consists generally in the combination of a crank-shaft mounted at the forward end of the sled, of a second shaft pivotally arranged at the rear thereof, the arms or legs arranged upon said pivotally-supported shaft, a series of cords connecting the same with said crank-shaft, and the treadles connected with said crank-shaft in position to be operated by the feet of the rider, all as hereinafter described, and particularly pointed out in the claims.

In the accompanying drawings, forming a part of this specification, Figure 1 is a perspective view of a sled with my invention attached thereto. Fig. 2 is a plan view of the crank-shaft and treadles. Fig. 3 is a side elevation of one of the treadles. Fig. 4 is a section showing the position of the treadles and crank-shaft and the cords passing over the rolls connecting the crank-shaft and the mechanism for operating the propelling-arms at the rear of the sled. Fig. 5 is a detail view of a portion of the mechanism at the rear of the sled.

In the drawings, 2 and 3 represent, respectively, the forward and rear parts of the sled, and 4 the body or framework supported thereby and within which is arranged the mechanism for propelling the sled. The runners and body may be made in the ordinary manner and do not require a detailed description.

At the forward end of the body 4 I arrange the crank-shaft 5, extending across the sled and having its ends mounted in bearings in the sides of the body 4. The crank-shaft 5 is provided upon either side of its middle portion with offsets 6 6 and 7 7, and at its middle portion it is provided with offsets 8 and 9, as clearly shown in Fig. 2. Near the crank-shaft 5 I arrange the shaft 10, having its ends secured in the side of the body 4 and forming a support for the rear end of the treadles 11 and 12, their forward ends being pivotally secured to the ends of the cranks 13 and 14, which are pivotally supported by the offset portions 8 and 9 of the crank-shaft 5. Suitable foot-rests 15 are provided upon the upper side of the treadles 11 and 12, and straps 16 may be provided to pass over the feet of the operator and prevent them from slipping off the treadles. A seat 17 is arranged upon the body 4, preferably at a point above the shaft 10, where the treadles can be conveniently operated by the occupant of the sled.

At the rear of the body 4, at the lower side thereof, I arrange the transverse shaft 18, having its end supported by the body of the sled and provided upon the inside of the body 4 with laterally-projecting arms 19, extending toward the rear of the sled and provided at their outer ends with a shaft 20, which extends across the sled and projects through curved slots 21, provided at the rear of the body 4. Upon each end of the shaft 20, outside of the body of the sled, I provide arms or legs 22, provided at their free ends with slots 23 to receive lugs provided upon the ends of the feet 24, as shown in Fig. 1. Bolts 25 are provided to pass through the ends of the arms 22 and through the lugs provided upon the feet 24, thereby securing the parts together. The feet 24 are provided with sharp corners or projections which dig into the snow or ice and prevent the legs from slipping when power is applied to the mechanism to move the sled. These parts 24 may be made of metal with the corners sharpened, so that the legs will not become worn by frequent contact with rough ice or snow, and the sharp edges will prevent the legs from slipping even when passing over very smooth ice or hard-trodden snow. Near the lower end of the slots 21 I arrange a shaft 26, having its ends supported in the sides of the body 4 and provided at suitable intervals with idler-pulleys 27, and near the upper ends of the slots 21 I provide a similar shaft 28, supported by the body 4, also carrying idler-pulleys 29. In front of the shaft 28, at the lower side of the body 4, I arrange the shaft 30, carrying the idler-pulleys 31, said shaft being mounted in the sides of the body 4 and in substantially the same plane as the shaft 26.

To connect the mechanism at the rear of the sled with the crank-shaft, I provide the cords 32 32, connecting the offset portions 7 7 with the shaft 20 at the rear of the sled. These cords are suitably secured at each end and pass over the idler-pulleys 29 and beneath the idler-pulleys 31, heretofore described. I also provide cords 33 33, connecting the offset portions 6 6 of the crank-shaft with the shaft 20 and passing under the idler-pulleys 27, arranged upon the shaft 26. At the forward end of the sled I provide an upright rod or shaft 34, having its lower end secured to the sled 2 and its upper end provided with a lever 35, by means of which the sled may be steered by the operator. Upon the left-hand side of the body 4 I arrange the upright pivoted lever 36, and at the rear of the sled 3 I arrange a pivoted frame 37, normally held in a horizontal position by suitable spring mechanism and connected with the lower end of the lever 36 by cord or chain. When going downhill or at any time desired, the operator can stop the sled by throwing back the lever 36, thereby bringing the lower edge of the frame 37 in contact with the surface of the ice or snow.

The operation of the device is as follows: The power being applied to the treadles by the operator, the shaft 20 will be thrown to the upper end of the slots 21 and the legs 22 raised to the position indicated in Fig. 1. At this point the crank-shaft will also reach the point shown in Figs. 1 and 3 and the cranks and treadles will be at the limit of their movement in that direction. Upon applying power to the other treadle the shaft 20 will be drawn down along the slot 21, and the sharp edges of the feet 24 engaging the surface of the ice or snow the sled will be forced along until the shaft 20 has reached the lower ends of the slots 21 and the treadle reached the limit of its movement in that direction. The operation is then continued as before.

In case it is desired at any time to back the sled the bolts 25 may be removed and the feet 24 separated from the legs 22, thereby permitting the same to swing forward to a position in front of the shaft 18. The feet 24 may then be secured to the legs, and by reversing the operation of the mechanism the sled may be backed any desired distance.

While I have shown but one set of legs for propelling the sled, it is obvious that I may increase the number of these legs and connect them with the crank-shaft in substantially the same manner in case it is desired to use the device in connection with a large or heavy sled.

Having thus described my invention, I claim as new and desire to secure by Letters Patent—

1. A device for propelling sleds, comprising a crank-shaft, treadles therefor, a swinging shaft, the legs carried thereby, and means connecting said swinging shaft, and said crank-shaft, substantially as described.

2. A device for propelling sleds, comprising a crank-shaft, treadles therefor, a stationary shaft, the arms carried thereby, the swinging shaft provided at or near the outer end of said arm, the legs carried by said swinging shaft in position to engage the surface of the ice or snow and means connecting said swinging shaft to said crank-shaft, substantially as described.

3. A device for propelling sleds, comprising a crank-shaft, treadles therefor, a stationary shaft, the arms provided thereon, the swinging shaft carried by said arms and projecting through openings in the sled-body, the legs provided on the ends of said swinging shaft and means connecting said swinging shaft to said crank-shaft, substantially as described.

4. A device for propelling sleds, comprising a crank-shaft, treadles therefor, a swinging shaft, the legs carried thereby, the removable feet provided upon the outer end of said legs and means for connecting said swinging shaft to said crank-shaft substantially as described.

5. In a device of the class described, the combination with the sled-body, of the crank-shaft having the middle and end offset portions, the treadles connected with said middle offset portions, the swinging shaft arranged at the rear of said body, the legs carried thereby, the cords connected to said swinging shaft and to the end offset portions provided on said crank-shaft, for the purpose set forth.

In testimony whereof I have hereunto set my hand this 14th day of June, A. D. 1897.

ANDERS ANDERSON.

In presence of—
 C. H. LARSEN,
 ED PETERSON.